(12) United States Patent
Kim

(10) Patent No.: US 6,348,776 B2
(45) Date of Patent: Feb. 19, 2002

(54) FLEXIBLE BATTERY CHARGER ADAPTABLE TO THE BATTERIES OF THE MOBILE PHONES OF DIFFERENT SIZES

(75) Inventor: Bong-Do Kim, Kyonggi-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/758,294

(22) Filed: Jan. 11, 2001

(30) Foreign Application Priority Data

Jan. 17, 2000 (KR) .......................................... 2000-1969

(51) Int. Cl.⁷ ............................................. H01M 10/46
(52) U.S. Cl. ...................................... 320/110; 320/112
(58) Field of Search ............................... 320/106, 110, 320/112, 116

(56) References Cited

U.S. PATENT DOCUMENTS

| | | | | |
|---|---|---|---|---|
| 5,057,761 A | * | 10/1991 | Felegyhazi, Sr. | 320/110 |
| 5,157,318 A | * | 10/1992 | Wang | 320/110 |
| 5,245,266 A | * | 9/1993 | Yuen | 320/110 |
| 5,280,229 A | * | 1/1994 | Faude et al. | 320/110 |
| 5,686,811 A | * | 11/1997 | Bushong et al. | 320/110 |

* cited by examiner

*Primary Examiner*—Edward H. Tso
(74) *Attorney, Agent, or Firm*—Steve Cha; Klauber & Jackson

(57) ABSTRACT

A mobile battery charger for charging different size of detachable battery packs which includes an upper casing frame having a charging groove for charging a detached battery pack, and a lower casing frame coupled to the upper casing frame for holding a printed circuit board, wherein a moveable support plate is provided between the upper and lower casing frames to adjustably receive the battery packs of different sizes.

8 Claims, 4 Drawing Sheets

FLEXIBLE BATTERY CHARGER ADAPTABLE TO THE BATTERIES OF THE MOBILE PHONES OF DIFFERENT SIZES

CLAIM OF PRIORITY

This application makes reference to and claims all benefits accruing under 35 U.S.C. Section 119 from an application entitled "FLEXIBLE BATTERY CHARGER ADAPTABLE TO THE BATTERIES OF THE MOBILE PHONE OF DIFFERENT SIZE" filed in the Korean Industrial Property Office on Jan. 17, 2000 and there duly assigned Ser. No. 2000-1969.

BACKGROUND OF THE INVENTION

1. Field of the Invention

The present invention relates to a desktop charger for charging a battery pack of a mobile phone. More particularly, the present invention relates to a flexible battery charger being adaptable for retaining different battery sizes.

2. Description of the Related Art

The conventional battery charger of a mobile phone is usually provided with two kinds of battery charging grooves, one of which is used for charging the mobile phone with a battery pack attached thereto and the other for charging a detached battery.

FIGS. 1 and 2 illustrate a perspective view and a cross sectional view of a conventional battery charger, respectively, wherein the battery charger includes a casing made of an upper casing frame 100 and a lower casing frame 200, a plurality of charging terminals 310 for contacting a battery pack 410, and a printed circuit board (PCB) 300 connected to the terminal contact element 310.

The upper casing frame 100 is provided with a first charging groove 110 for charging the battery pack 410 mounted on the mobile phone 400, and a second charging groove 120 for charging a detached battery pack. The charging terminals 310 are designed to partly protrude from the bottom surface of the charging grooves 110 and 120 for charging the battery packs. The frame 100 is also provided with at least one indication lamp 130 to notify the completion of the battery charge.

However, the second groove used for retaining the detachable battery in the conventional battery charger is fixed, thus fits only one type of battery pack. Hence, the conventional charger may not be used for charging other battery packs having different sizes. Currently, the size of a mobile telephone and its battery is becoming smaller and comes in different sizes and shapes. Thus, it is foreseeable that it would a waste of money and inconvenient for the users to purchase different battery chargers each time a new phone with smaller battery becomes available in the market.

SUMMARY OF THE INVENTION

It is an object of the present invention to provide a flexible battery charger, which may be adaptable and compatible for use with the mobile phone having various battery sizes.

In one aspect of the present invention, a mobile battery charger of for retaining and charging different battery packs is provided. The charger includes an upper casing frame provided with a charging groove for charging a detached battery pack, and a lower casing frame coupled to the upper casing frame for holding a printed circuit board therein, and a moveable support plate disposed between the upper casing frame and the lower casing frame being adaptable to receive different sizes of battery packs.

A more complete understanding of the apparatus of the present invention may be had by reference to the following detailed description when taken in conjunction with the accompanying drawings wherein:

BRIEF DESCRIPTION OF THE ATTACHED DRAWINGS

DETAILED DESCRIPTION OF THE PREFERRED EMBODIMENTS

Figure 1:
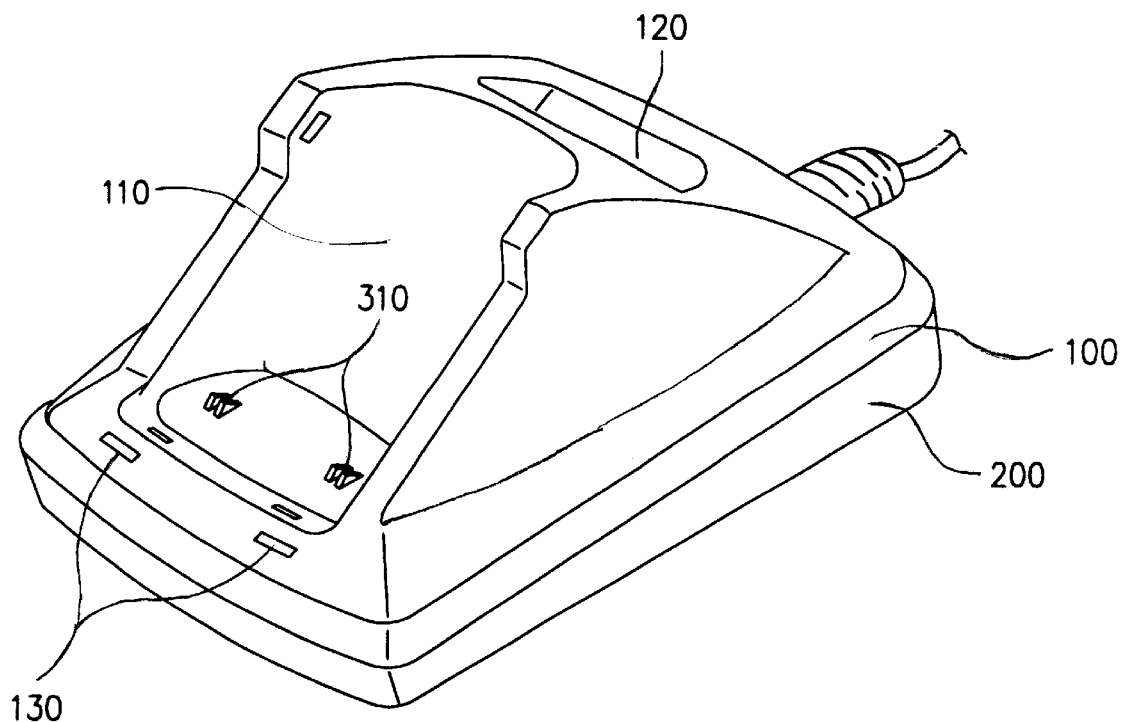
FIG. 1 is a perspective view of a conventional battery charger.
Figure 2:
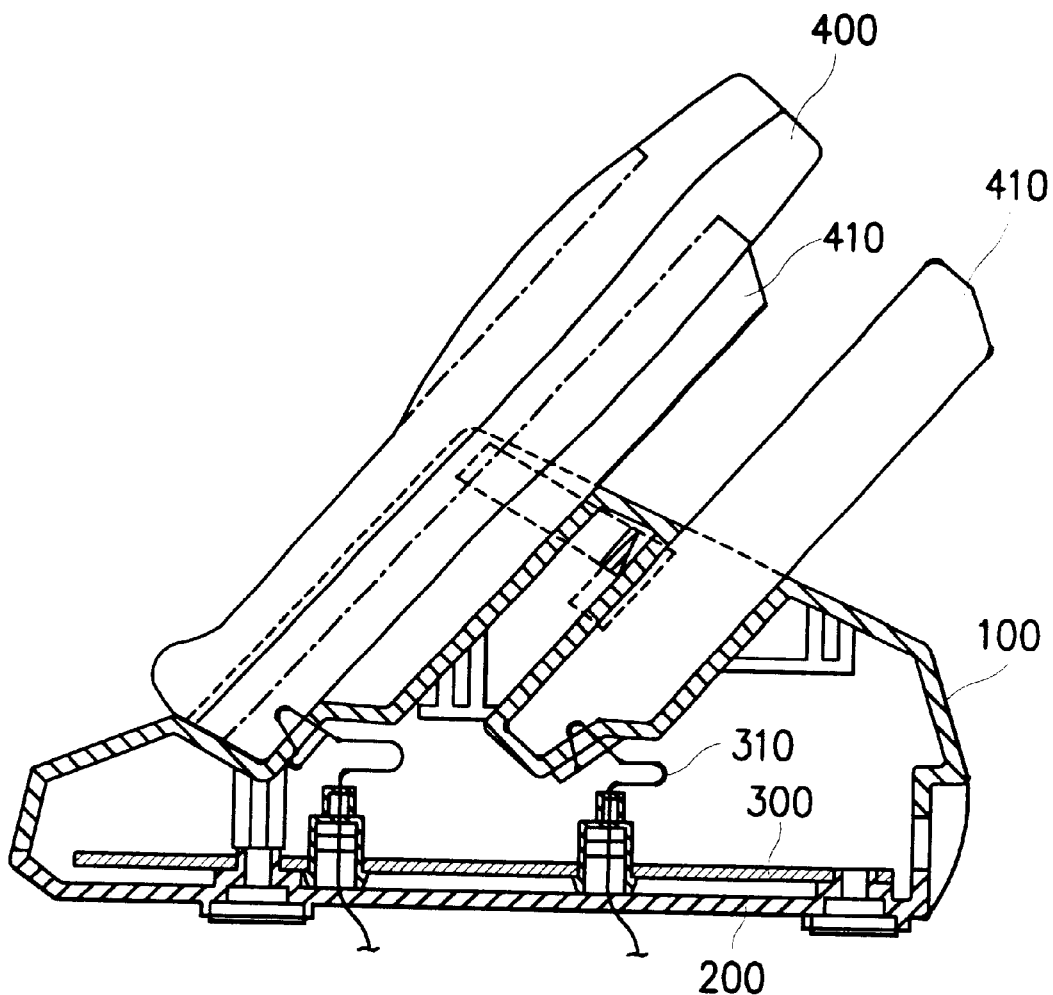
FIG. 2 is a cross sectional view of a conventional battery charger.

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

According to the embodiment of the present invention, the battery charger includes a casing having an upper casing frame 10 and a lower casing frame 20, a plurality of charging terminals 42 for charging a battery pack 40, and a printed circuit board PCB (not shown) coupled to the charging terminals 42 and to a direct current input jack.

The upper casing frame 10 is provided with a first charging groove 11 for retaining a mobile phone with its battery attached thereto to charge the battery, and a second charging groove 12 being adjustable to charge different battery sizes, thus enabling the charger to automatically adapt different battery sizes A moveable support plate 30 in a vertical direction is provided between the upper casing frame 10 and lower casing frame 20 and is adaptable to retain different battery sizes. That is, the movable support plate, defining a portion of the boundary for the second charging groove 12, is selectively movable in an upward or downward direction according to the size of the battery pack inserted in the second charging groove 12. Here, the moveable support plate 30 is resiliently pushed upwards so that the plate 30 may move downwards when a larger battery pack is inserted into the second charging groove. To this end, at least one guide pin 31 is mounted underneath the moveable support plate 30, and a boss 21 mounted in the lower casing frame 20 having a guide hole 22 for slidably guiding the guide pin 31 in a vertical direction. At least one spring element 14 is positioned between the top portion of the boss 21 and circumferentially surrounds the guide pin 31 to thrust the moveable support plate 30 in a upward direction. Thus, the spring element 14 is in contact with the movable support plate 30 at one end and the upper portion of the boss 21 at the other end.

Figure 3:
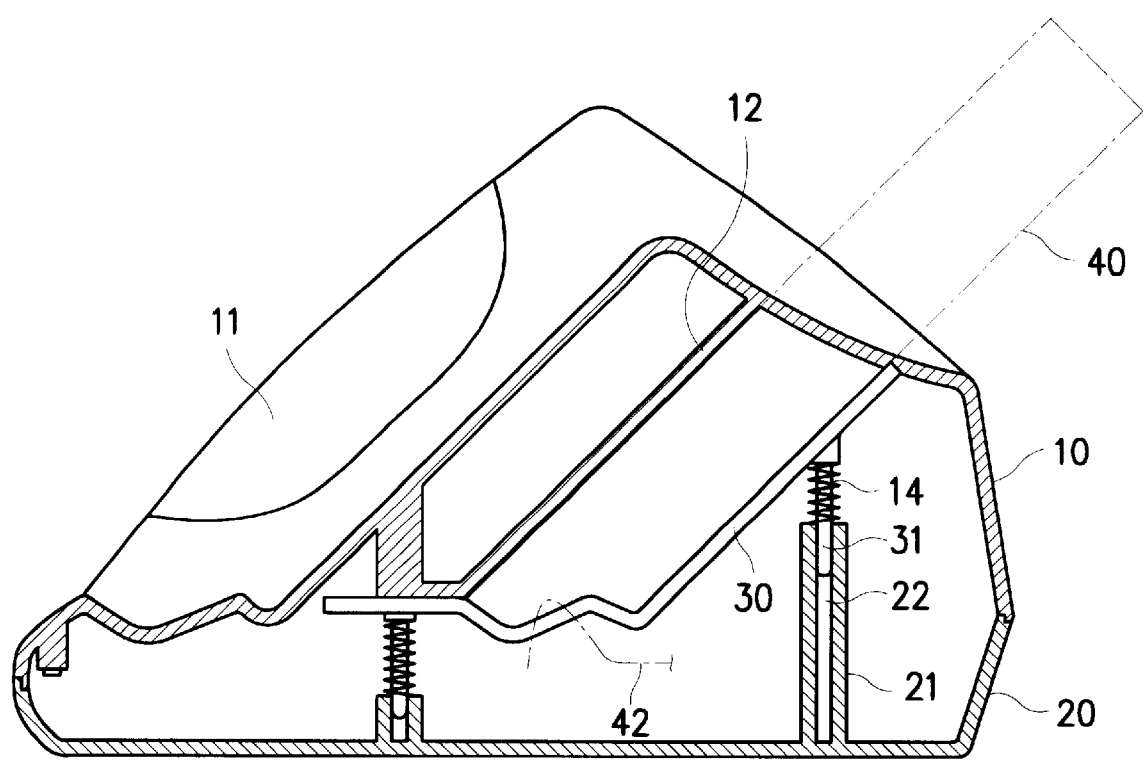
FIG. 3 is a cross sectional view of a battery charger holding a battery pack on a moveable support plate according to the present invention.
Figure 4:
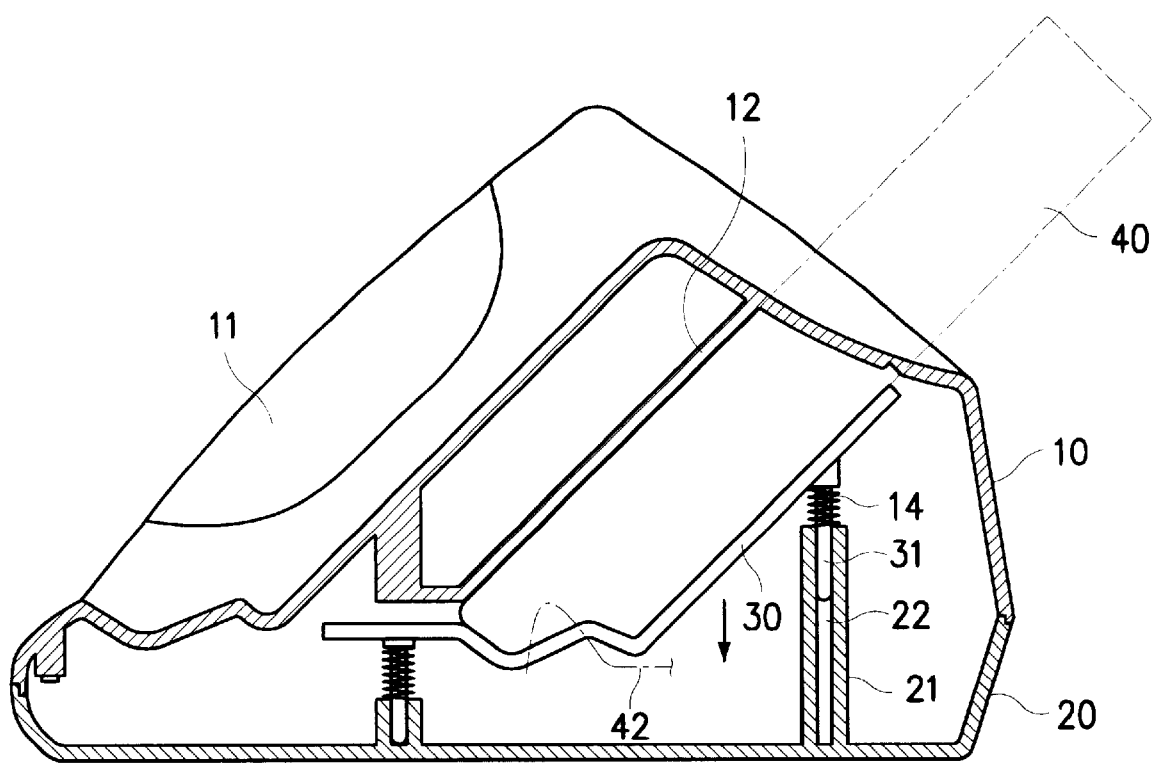
FIG. 4 is a view similar to FIG. 1 but with a battery pack of a different size mounted on the moveable support plate according to the present invention.

When a battery pack 50 of FIG. 4 being larger than the battery pack 40 of FIG. 3 is inserted in the second charging groove, as shown in FIG. 4, the moveable support plate 30 is resiliently pressed downwards with the guide pin 31 being guided downwards through the guide hole 22 of the boss 21. The charging of the battery pack 50 is done by a plurality of charging terminals element 42 protruding outwardly from the bottom surface of the moveable support plate. Here, the charging terminal element 42 is designed to protrude substantially enough to make a contact to the bottom of the battery pack 50 for charging purposes. Therefore, the inventive battery charger is adaptable for charging different battery packs in different sizes.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A mobile battery charger for charging a plurality of battery packs, said battery packs having different sizes, comprising:

an upper casing frame having at least one first charging groove for retaining said battery packs;

a lower casing frame coupled to said upper casing frame;

a printed circuit board disposed in a substantially horizontal orientation of said lower casing frame and coupled to a direct current input jack; and a moveable support plate disposed between said upper casing frame and said lower casing frame being adaptable to receive said battery packs of different sizes.

2. The battery charger as defined in claim 1, further comprising:

at least one guide pin mounted under said moveable support plate, and at least one boss element having an elongated hole coupled to the top surface of said lower casing frame for slidably receiving said guide pin in a vertical direction.

3. The battery charger as defined in claim 2, further comprising a spring element covering circumferentially around said guide pin for supporting said movable support plate in a upward direction at one end and contacting the upper portion of said boss element at the other end.

4. The battery charger as defined in claim 1, further comprising at least one second charging groove for retaining a mobile phone with a detachable battery.

5. The battery charger as defined in claim 1, further comprising a plurality of contact means protruding from the top surface of said movable support plate for charging said battery packs, said contact means coupled to said printed circuit board.

6. The battery charger as defined in claim 1, wherein said movable support plate having at least one opening for receiving at least one contact means coupled to said printed circuit board.

7. The battery charger as defined in claim 1, wherein said movable support plate defines one portion of the boundary of said first charging groove, said movable support plate being detachable away from the other boundary of said first charging groove.

8. The battery charger as defined in claim 1, further comprising a light source means coupled to said upper casing frame for indicating a completion of said charging.

* * * * *